(12) United States Patent
Godin et al.

(10) Patent No.: US 12,225,454 B2
(45) Date of Patent: Feb. 11, 2025

(54) METHOD AND APPARATUS FOR SELECTING A NETWORK CELL OR FREQUENCY INFLUENCED BY NETWORK SLICING

(71) Applicant: NOKIA TECHNOLOGIES OY, Espoo (FI)

(72) Inventors: Philippe Godin, Versailles (FR); Alessio Casati, West Molesey (GB)

(73) Assignee: NOKIA TECHNOLOGIES OY, Espoo (FI)

( * ) Notice: Subject to any disclaimer, the term of this patent is extended or adjusted under 35 U.S.C. 154(b) by 367 days.

(21) Appl. No.: 17/791,758

(22) PCT Filed: Jan. 7, 2021

(86) PCT No.: PCT/EP2021/050163
§ 371 (c)(1),
(2) Date: Jul. 8, 2022

(87) PCT Pub. No.: WO2021/140138
PCT Pub. Date: Jul. 15, 2021

(65) Prior Publication Data
US 2023/0048803 A1 Feb. 16, 2023

(30) Foreign Application Priority Data
Jan. 8, 2020 (EP) .................................. 20150760

(51) Int. Cl.
*H04W 48/18* (2009.01)
*H04W 48/16* (2009.01)

(52) U.S. Cl.
CPC ........... *H04W 48/18* (2013.01); *H04W 48/16* (2013.01)

(58) Field of Classification Search
CPC ...... H04W 48/18; H04W 48/16; H04W 48/20
See application file for complete search history.

(56) References Cited

U.S. PATENT DOCUMENTS

| 2018/0288654 | A1  | 10/2018 | Shih et al. |
| 2018/0324602 | A1  | 11/2018 | Griot et al. |
| 2019/0014515 | A1* | 1/2019  | Zee ................. H04W 36/0027 |
| 2019/0028941 | A1* | 1/2019  | Zee ................. H04W 36/0077 |
| 2019/0320314 | A1* | 10/2019 | Yang .................... H04W 40/12 |
| 2020/0120547 | A1* | 4/2020  | Han .................. H04W 36/0083 |

(Continued)

FOREIGN PATENT DOCUMENTS

| EP | 3 589 064 A1    | 1/2020 |
| WO | 2017/140342 A1  | 8/2017 |

(Continued)

OTHER PUBLICATIONS

International Search Report and Written Opinion corresponding to International Patent Application No. PCT/EP2021/050163, dated Mar. 15, 2021.

(Continued)

*Primary Examiner* — Peter P Chau
(74) *Attorney, Agent, or Firm* — Robert P. Michal, Esq.; Carter, DeLuca & Farrell LLP (57) ABSTRACT

A method comprising: obtaining, at a user equipment, information on a cell network slice support; determining, for the user equipment a network slice; and selecting one cell supporting the determined network slice based on the information.

4 Claims, 7 Drawing Sheets

(56) References Cited

U.S. PATENT DOCUMENTS

| | | | |
|---|---|---|---|
| 2020/0296631 A1* | 9/2020 | Young | H04W 76/36 |
| 2020/0305054 A1* | 9/2020 | Zee | H04W 36/0061 |
| 2022/0400421 A1* | 12/2022 | Hong | H04W 4/20 |

FOREIGN PATENT DOCUMENTS

| | | |
|---|---|---|
| WO | 2017/157118 A1 | 9/2017 |
| WO | 2018/219352 A1 | 12/2018 |
| WO | 2019/134537 A1 | 7/2019 |

OTHER PUBLICATIONS

Nokia et al., "Way Forward with private networks", 3GPP TSG-RAN WG3#105, Ljubljana, Slovenia, Aug. 26-30, 2019, R3-194686, XP051770847, 5 pages.

Communication under Rule 71(3) EPC dated Sep. 18, 2023, corresponding to European Patent Application No. 20150760.5.

"3rd Generation Partnership Project; Technical Specification Group Services and System Aspects; System Architecture for the 5G System (5GS); Stage 2 (Release 16)", 3GPP TS 23.501, V16.2.0, Sep. 2019, pp. 1-391.

"Key Issue on 5GC assisted cell selection to access network slice", SA WG2 Meeting #136, S2-1912732, Agenda: 8.8, Samsung, Nov. 18-22, 2019, pp. 1-3.

"Generic Network Slice Template", GSM Association, Official Document NG.116, Version 6.0, Nov. 25, 2021, pp. 1-65.

Partial European Search Report received for corresponding European Patent Application No. 20150760.5, dated Jun. 26, 2020, 14 pages.

Extended European Search Report received for corresponding European Patent Application No. 20150760.5, dated Dec. 3, 2020, 18 pages.

"NPN—E1 Aspects", 3GPP TSG-RAN WG3 Meeting #106, R3-197362, Agenda: 16.2.7, Ericsson, Nov. 18-22, 2019, pp. 1-8.

"Further discussions on MFBI support in GERAN", 3GPP TSG GERAN#60, GP-131029, Agenda: 7.2.5.3.6, Telefon AB LM Ericsson, Nov. 18-22, 2013, 3 pages.

"Report CGI in NTN", 3GPP TSG-RAN WG2 Meeting#106, R2-1906266, Agenda: 11.6.4.1, ZTE Corporation, Sanechips, May 13-17, 2019, 3 pages.

Communication under rule 71(3) EPC received for corresponding European Patent Application No. 20150760.5, dated Mar. 15, 2023, 7 pages.

Communication under rule 71(3) EPC received for corresponding European Patent Application No. 20150760.5, dated Feb. 19, 2024, 7 pages.

* cited by examiner

METHOD AND APPARATUS FOR SELECTING A NETWORK CELL OR FREQUENCY INFLUENCED BY NETWORK SLICING

TECHNICAL FIELD

The present disclosure relates to an apparatus, a method, and a computer program and in particular but not exclusively for an apparatus, methods and computer programs for selecting a network cell or frequency influenced by network slicing.

BACKGROUND

A communication system can be seen as a facility that enables communication sessions between two or more entities such as communication devices, base stations/access points and/or other nodes by providing carriers between the various entities involved in the communications path. A communication system can be provided for example by means of a communication network and one or more compatible communications devices.

Access to the communication system may be via an appropriate communications device or terminal. A communications device is provided with an appropriate signal receiving and transmitting apparatus for enabling communications, for example enabling access to a communication network or communications directly with other communications device. The communications device may access a cell/carrier provided by a station or access point, and transmit and/or receive communications on the cell/carrier.

The communication system and associated devices typically operate in accordance with a given standard or specification which sets out what the various entities associated with the system are permitted to do and how that should be achieved.

STATEMENT OF INVENTION

According to an aspect, there is provided a method comprising obtaining, at a user equipment, information on a cell network slice support; determining, for the user equipment a network slice; and selecting one cell supporting the determined network slice based on the information.

Obtaining, at a user equipment, information on a cell network slice support may comprise receiving a slice-closed access group mapping from a core node.

Obtaining, at a user equipment, information on a cell network slice support may further comprise decoding a list of closed access group identifiers supported by any surrounding cells.

Selecting one cell supporting the determined network slice based on the information may comprise selecting one cell based on a match between the determined network slice and network slice mapped from the cell closed access group identifiers.

Obtaining, at a user equipment, information on a cell network slice support may comprise receiving a list of frequency bands supported by a slice from a core node.

Obtaining, at a user equipment, information on a cell network slice support may further comprise determining frequency bands supported by any surrounding cells.

Selecting one cell supporting the determined network slice based on the information may comprise selecting one cell based on a match between the frequency bands supported by any surrounding cells and a list of frequency bands supported by the determined network slice.

The list of frequency bands may be identified based on a radio access technology frequency selection priority identifier.

The cell may be one of: a next-generation Radio Access Network cell; an Evolved-Universal Mobile Telecommunications Service Terrestrial Radio Access Network cell; an Universal Mobile Telecommunications Service Radio Access Network cell; and a WA network cell.

According to a second aspect there is provided a method comprising: generating, information on a cell network slice support; transmitting to a user equipment the information on a cell network slice support, wherein the user equipment is configured to determine a network slice and select one cell supporting the determined network slice based on the information.

The information may comprise at least one of: a slice-closed access group mapping; a list of frequency bands supported by a slice; and radio access technology frequency selection priority identifiers supported by a slice.

According to a third aspect there is provided a method comprising: generating, a list of closed access group identifiers supported by a cell and/or frequency band identifiers supported by a cell; transmitting the list of closed access group identifiers supported by a cell and/or frequency band identifiers supported by a cell to a user equipment wherein the user equipment is configured to obtain information on cell network slice support, determine a network slice, and select the cell supporting the determined network slice based on the information.

According to a fourth aspect an apparatus comprising: at least one processor; and at least one memory including computer program code, the at least one memory and computer program code configured to, with the at least one processor, cause the apparatus to perform: obtain information on a cell network slice support; determine, for the apparatus a network slice; and select one cell supporting the determined network slice based on the information.

The apparatus caused to obtain information on a cell network slice support may be configured to receive a slice-closed access group mapping from a core node.

The apparatus caused to obtain information on a cell network slice support may be further caused to decode a list of closed access group identifiers supported by any surrounding cells.

The apparatus caused to select one cell supporting the determined network slice based on the information may be caused to select one cell based on a match between the determined network slice and network slice mapped from the cell closed access group identifiers.

The apparatus caused to obtain information on a cell network slice support may be caused to receive a list of frequency bands supported by a slice from a core node.

The apparatus caused to obtain information on a cell network slice support may be further caused to determine frequency bands supported by any surrounding cells.

The apparatus caused to select one cell supporting the determined network slice based on the information may be caused to select one cell based on a match between the frequency bands supported by any surrounding cells and a list of frequency bands supported by the determined network slice.

The list of frequency bands may be identified based on a radio access technology frequency selection priority identifier.

The cell may be one of: a next-generation Radio Access Network cell; an Evolved-Universal Mobile Telecommunications Service Terrestrial Radio Access Network cell; an Universal Mobile Telecommunications Service Radio Access Network cell; and a Wi-fi network cell.

The apparatus may be a user equipment.

According to a fifth aspect there is provided an apparatus comprising: at least one processor; and at least one memory including computer program code, the at least one memory and computer program code configured to, with the at least one processor, cause the apparatus to perform: generate, information on a cell network slice support; transmit to a user equipment the information on a cell network slice support, wherein the user equipment is configured to determine a network slice and select one cell supporting the determined network slice based on the information.

The information may comprise at least one of: a slice-closed access group mapping; a list of frequency bands supported by a slice; and radio access technology frequency selection priority identifiers supported by a slice.

The apparatus may be an Access and Mobility Management Function.

According to a sixth aspect there is provided an apparatus comprising: at least one processor; and at least one memory including computer program code, the at least one memory and computer program code configured to, with the at least one processor, cause the apparatus to perform: generate a list of closed access group identifiers supported by a cell and/or frequency band identifiers supported by a cell; transmit the list of closed access group identifiers supported by a cell and/or frequency band identifiers supported by a cell to a user equipment wherein the user equipment is configured to obtain information on cell network slice support, determine a network slice, and select the cell supporting the determined network slice based on the information.

The apparatus may be an access node caused to implement the cell.

According to a seventh aspect, there is provided an apparatus comprising means for: obtaining information on a cell network slice support; determining, for the apparatus a network slice; and selecting one cell supporting the determined network slice based on the information.

The means for obtaining information on a cell network slice support may be for receiving a slice-closed access group mapping from a core node.

The means for obtaining information on a cell network slice support may be for decoding a list of closed access group identifiers supported by any surrounding cells.

The means for selecting one cell supporting the determined network slice based on the information may be for selecting one cell based on a match between the determined network slice and network slice mapped from the cell closed access group identifiers.

The means for obtaining information on a cell network slice support may be for receiving a list of frequency bands supported by a slice from a core node.

The means for obtaining information on a cell network slice support may be further for determining frequency bands supported by any surrounding cells.

The means for selecting one cell supporting the determined network slice based on the information may be for selecting one cell based on a match between the frequency bands supported by any surrounding cells and a list of frequency bands supported by the determined network slice.

The list of frequency bands may be identified based on at least one radio access technology frequency selection priority identifier(s).

The cell may be one of: a next-generation Radio Access Network cell; an Evolved-Universal Mobile Telecommunications Service Terrestrial Radio Access Network cell; an Universal Mobile Telecommunications Service Radio Access Network cell; and a Wi-fi network cell.

The apparatus may be a user equipment.

According to an eighth aspect, there is provided an apparatus comprising means for: generating, information on a cell network slice support; transmitting to a user equipment the information on a cell network slice support, wherein the user equipment is configured to determine a network slice and select one cell supporting the determined network slice based on the information.

The information may comprise at least one of: a slice-closed access group mapping; a list of frequency bands supported by a slice; and radio access technology frequency selection priority identifiers supported by a slice.

The apparatus may be an Access and Mobility Management Function.

According to a ninth aspect there is provided an apparatus comprising means for: generating a list of closed access group identifiers supported by an cell and/or frequency band identifiers supported by a cell; transmitting the list of closed access group identifiers supported by a cell and/or frequency band identifiers supported by a cell to a user equipment wherein the user equipment is configured to obtain information on cell network slice support, determine a network slice, and select the cell supporting the determined network slice based on the information.

The apparatus may be an access node caused to implement the cell.

According to a tenth aspect, there is provided a non-transitory computer readable storage medium comprising computer readable instructions, which when run by at least one processor, cause an apparatus to: obtain information on a cell network slice support; determine, for the apparatus a network slice; and select one cell supporting the determined network slice based on the information.

According to an eleventh aspect, there is provided a non-transitory computer readable storage medium comprising computer readable instructions, which when run by at least one processor, cause an apparatus to: generate, information on a cell network slice support; transmit to a user equipment the information on a cell network slice support, wherein the user equipment is configured to determine a network slice and select one cell supporting the determined network slice based on the information.

The information may comprise at least one of: a slice-closed access group mapping; a list of frequency bands supported by a slice; and radio access technology frequency selection priority identifiers supported by a slice.

According to a twelfth aspect, there is provided a non-transitory computer readable storage medium comprising computer readable instructions, which when run by at least one processor, cause an apparatus to: generate a list of closed access group identifiers supported by a cell and/or frequency band identifiers supported by a cell; transmit the list of closed access group identifiers supported by a cell and/or frequency band identifiers supported by a cell to a user equipment wherein the user equipment is configured to obtain information on cell network slice support, determine a network slice, and select the cell supporting the determined network slice based on the information.

According to a thirteenth aspect, there is provided a computer program comprising instructions for causing an apparatus to perform at least: obtain information on a cell network slice support; determine, for the apparatus a network slice; and select one cell supporting the determined network slice based on the information.

According to a fourteenth aspect, there is provided a computer program comprising instructions for causing an apparatus to perform at least: generate, information on a cell network slice support; transmit to a user equipment the information on a cell network slice support, wherein the user equipment is configured to determine a network slice and select one cell supporting the determined network slice based on the information.

According to a fifteenth aspect, there is provided a computer program comprising instructions for causing an apparatus to perform at least: generate a list of closed access group identifiers supported by a cell and/or frequency band identifiers supported by a cell; transmit the list of closed access group identifiers supported by an cell and/or frequency band identifiers supported by a cell to a user equipment wherein the user equipment is configured to obtain information on cell network slice support, determine a network slice, and select the cell supporting the determined network slice based on the information.

According to a sixteenth aspect, there is provided an apparatus comprising: circuitry configured to obtain information on a cell network slice support; circuitry configured to determine, for the apparatus a network slice; and circuitry configured to select one cell supporting the determined network slice based on the information.

According to a seventeenth aspect, there is provided an apparatus comprising: circuitry configured to generate, information on a cell network slice support; circuitry configured to transmit to a user equipment the information on a cell network slice support, wherein the user equipment is configured to determine a network slice and select one cell supporting the determined network slice based on the information.

According to an eighteenth aspect, there is provided an apparatus comprising: circuitry configured to generate a list of closed access group identifiers supported by a cell and/or frequency band identifiers supported by a cell; circuitry configured to transmit the list of closed access group identifiers supported by an cell and/or frequency band identifiers supported by a cell to a user equipment wherein the user equipment is configured to obtain information on cell network slice support, determine a network slice, and select the cell supporting the determined network slice based on the information.

In the above, many different aspects have been described. It should be appreciated that further aspects may be provided by the combination of any two or more of the aspects described above.

Various other aspects are also described in the following detailed description and in the attached claims.

BRIEF DESCRIPTION OF THE FIGURES

Some example embodiments will now be described in further detail, by way of example only, with reference to the following examples and accompanying drawings, in which.

DETAILED DESCRIPTION

In the following certain embodiments are explained with reference to mobile communication devices capable of communication via a wireless cellular system and mobile communication systems serving such mobile communication devices. Before explaining in detail the exemplifying embodiments, certain general principles of a wireless communication system, access systems thereof, and mobile communication devices are briefly explained with reference to FIGS. 1, 2 and 3 to assist in understanding the technology underlying the described examples.

Figure 1:
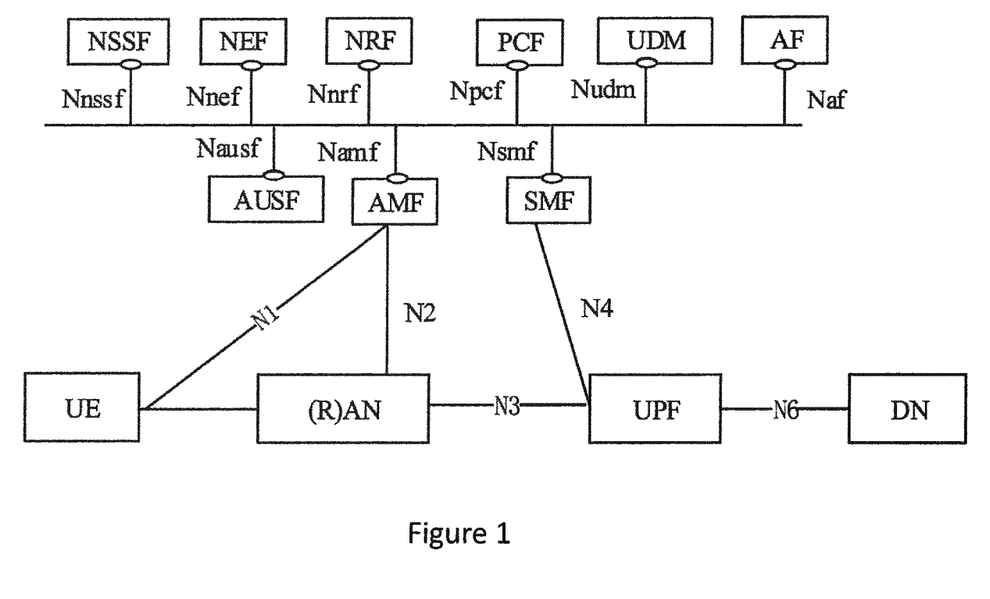
FIG. 1 shows a representation of a network system according to some example embodiments.

FIG. 1 shows a schematic representation of a 5G system (5GS). The 5GS may be comprised by a terminal or user equipment (UE), a 5G radio access network (5GRAN) or next generation radio access network (NG-RAN), a 5G core network (5GC), one or more application function (AF) and one or more data networks (DN).

The 5G-RAN may comprise one or more gNodeB (GNB) or one or more gNodeB (GNB) distributed unit functions connected to one or more gNodeB (GNB) centralized unit functions.

The 5GC may comprise the following entities: Network Slice Selection Function (NSSF); Network Exposure Function; Network Repository Function (NRF); Policy Control Function (PCF); Unified Data Management (UDM); Application Function (AF); Authentication Server Function (AUSF); an Access and Mobility Management Function (AMF); and Session Management Function (SMF).

Figure 2:
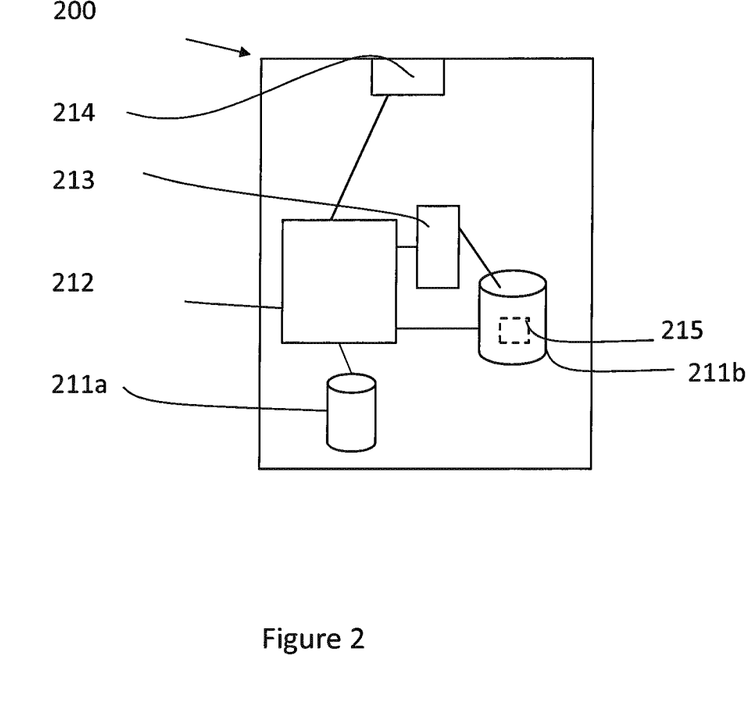
FIG. 2 shows a representation of a control apparatus according to some example embodiments.

FIG. 2 illustrates an example of a control apparatus 200 for controlling a function of the 5GRAN or the 5GC as illustrated on FIG. 1. The control apparatus may comprise at least one random access memory (RAM) 211a, at least on read only memory (ROM) 211b, at least one processor 212, 213 and an input/output interface 214. The at least one processor 212, 213 may be coupled to the RAM 211a and the ROM 211b. The at least one processor 212, 213 may be configured to execute an appropriate software code 215. The software code 215 may for example allow to perform one or more steps to perform one or more of the present aspects. The software code 215 may be stored in the ROM 211b. The control apparatus 200 may be interconnected with another control apparatus 200 controlling another function of the 5GRAN or the 5GC. In some embodiments, each function of the 5GRAN or the 5GC comprises a control apparatus 200. In alternative embodiments, two or more functions of the 5GRAN or the 5GC may share a control apparatus.

Figure 3:
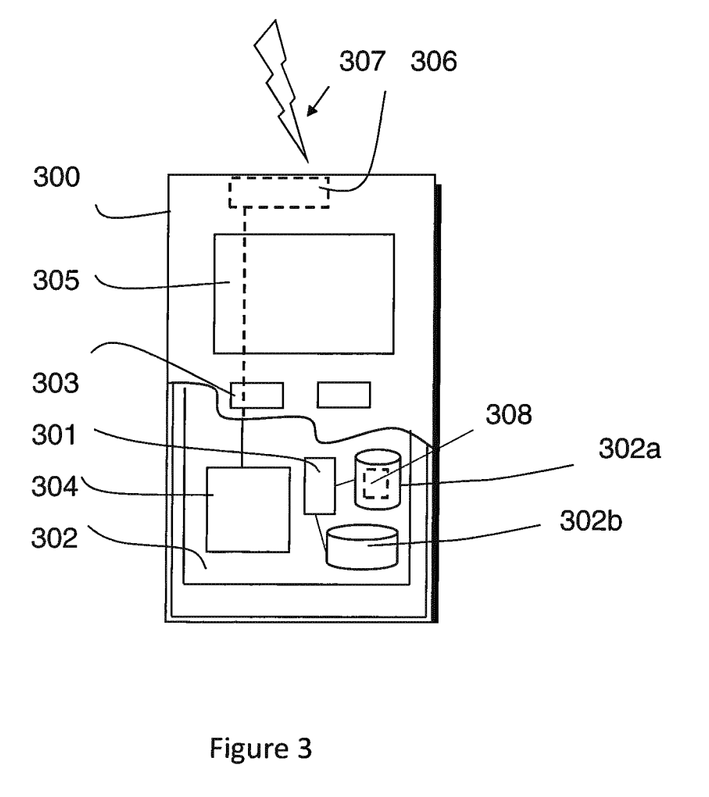
FIG. 3 shows a representation of an apparatus according to some example embodiments.

FIG. 3 illustrates an example of a terminal 300, such as the terminal illustrated on FIG. 1. The terminal 300 may be provided by any device capable of sending and receiving radio signals. Non-limiting examples comprise a user equipment, a mobile station (MS) or mobile device such as a mobile phone or what is known as a 'smart phone', a computer provided with a wireless interface card or other wireless interface facility (e.g., USB dongle), a personal data assistant (PDA) or a tablet provided with wireless communication capabilities, a machine-type communications (MTC) device, an Internet of things (IoT) type communication device or any combinations of these or the like. The terminal 300 may provide, for example, communication of data for carrying communications. The communications may be one or more of voice, electronic mail (email), text message, multimedia, data, machine data and so on.

The terminal 300 may receive signals over an air or radio interface 307 via appropriate apparatus for receiving and may transmit signals via appropriate apparatus for transmitting radio signals. In FIG. 3 transceiver apparatus is designated schematically by block 306. The transceiver apparatus 306 may be provided for example by means of a radio part and associated antenna arrangement. The antenna arrangement may be arranged internally or externally to the mobile device.

The terminal 300 may be provided with at least one processor 301, at least one memory ROM 302a, at least one RAM 302b and other possible components 303 for use in software and hardware aided execution of tasks it is designed to perform, including control of access to and communications with access systems and other communication devices. The at least one processor 301 is coupled to the RAM 311a and the ROM 311b. The at least one processor 301 may be configured to execute an appropriate software code 308. The software code 308 may for example allow to perform one or more of the present aspects. The software code 308 may be stored in the ROM 311b.

The processor, storage and other relevant control apparatus can be provided on an appropriate circuit board and/or in chipsets. This feature is denoted by reference 304. The device may optionally have a user interface such as key pad 305, touch sensitive screen or pad, combinations thereof or the like. Optionally one or more of a display, a speaker and a microphone may be provided depending on the type of the device.

In 5G (and in particular 3GPP release 15) network slicing has been introduced and is described in 3GPP Technical Specification (TS) 23.501. From a mobile operator's point of view, a network slice is an independent end-to-end logical network that runs on a shared physical infrastructure, capable of providing a negotiated service quality. A network slice could span across multiple parts of the network (e.g. user equipment, access network, core network and transport network) and could also be deployed across multiple operators. A network slice comprises dedicated and/or shared resources, e.g. in terms of processing power, storage, and bandwidth and has isolation from the other network slices. Slice types could be defined from a functional or behavioural perspective. It is therefore anticipated that operators could deploy a single network slice type that satisfies the needs of multiple verticals, as well as multiple network slices of different types that are packaged as a single product targeted towards business customers (a business bundle) who have multiple and diverse requirements (for example a vehicle may need simultaneously a high bandwidth slice for infotainment and an ultra reliable slice for telemetry, assisted driving).

A slice is identified by a Single-Network Slice Assistance Information (S-NSSAI) message. The S-NSSAI is used to uniquely identify a Network Slice. The S-NSSAI contains two components: the SST (Slice/Service Type) and an optional SD (Slice Differentiator). During the attach procedure, or by means a UE configuration Update, the configured NSSAI is sent from the core network (5GC) to the user equipment (UE).

At every registration area update the UE can indicate a requested NSSAI which is a list of requested S-NSSAI(s). The AMF takes this into account together with subscribed NSSAI to infer an allowed NSSAI which is sent back to the UE. This allowed NSSAI represents the list of S-NSSAI(s) the UE is allowed to use for further requests taking place in this registration area. This also takes into account whether the requested S-NSSAIs are supported in the tracking area (TA) where the UE is.

In 3GPP release 16 Public Network Integrated Non Public Networks (PNI-NPN) are introduced using the concept of closed access groups (CAG) to manage exclusive access control. To that purpose a cell is configured to broadcast a list of cell-supported-CAG IDs on one side. The 5GC sends to the UE a list of allowed CAG IDs on the other side. Exclusive access to cells is given to UEs for which the UE allowed list of CAG IDs matches the cell-supported-CAG list.

One of the use cases foreseen for Public Network Integrated Non Public Networks (PNI-NPN) is to combine with slicing in which case mapping would exist in the 5GC between one or more CAG IDs to one or more S-NSSAI(s).

As radio spectrum for 5G may be more than ten times wider than the radio spectrum for 4G (as practical operational spectrum bands of 4G are less than 3 GHz in the most of regions) the ability to manage a wide range of 5G frequencies efficiently is an aim of some embodiments of the application.

For example one aim of the application is to operate within the radio spectrum supported by the network slice. A specific frequency band can be used to access a specific network slice(s). For instance, Enhanced Mobile Broadband (eMBB) slices can be supported in 2.6 GHz and 4.9 GHz while Ultra Reliable Low Latency Communications (URLLC) slice can be supported only in 4.9 GHz. In some other deployment scenarios, the lower frequency band can be used for Internet of Things (IoT) while using the higher frequency bands for eMBB services. That is, the combination of the spectrum bands and the network slices can be a good tool for operators requiring the service isolation/management as well as the maximum use of the 5G spectrum bands.

In 3GPP Release 16 network slicing, determination of RAT/Frequency Selection Priority (RFSP) index taking the allowed NSSAI into account is specified.

The embodiments as discussed herein are ones where a UE is configured to receive information as to which network slices are supported by a cell. In such embodiments the UE, interested in a certain network slice, can be configured to select a cell that supports that network slice. In other words the UE's cell selection can be dependent on said information.

In some embodiments this information, provided to the UE, is provided from the core network, as part of the "Configured S-NSSAI" information. This "Configured S-NSSAI" information can be provided to the UE during the (initial) attach procedure (or by means of a "UE configuration update").

This list "Configured S-NSSAI" information may be transmitted to the UE occasionally and thus avoid the need to use significant signalling bandwidth.

In some embodiments the information may be a mapping between S-NSSAI(s) and CAG ID and/or supported frequency bands.

As each cell is configured to broadcast its CAG ID(s) the UE can check each available cell's CAG ID(s) and compare with the mapped S-NSSAI(s). From this comparison the UE can then determine which cell will (or will not) support the respective network slice the UE is interested in. Similarly as the supported frequency bands can be determined by the UE, the UE can check supported frequency bands and compare with the mapped S-NSSAI(s) in order to determine which cell will (or will not) support the respective network slice the UE is interested in.

As such this enables an UE to be able to select a proper cell/RAN node at the initial registration.

Figure 4:
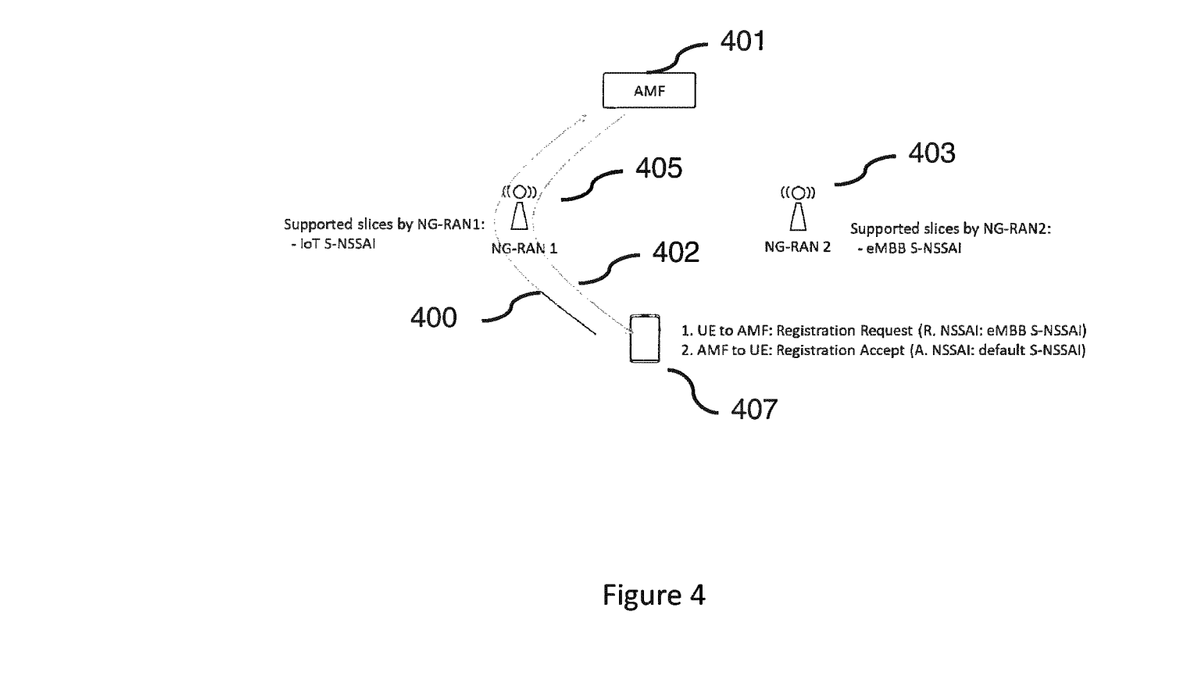
FIG. 4 shows a representation of a registration procedure according to some example embodiments.

For example, as shown in FIG. 4 the 5GC is represented by the Access and Mobility Management Function (AMF) 401, a first RAN node (NG-RAN 1) 405 which in a deployment scenario where supports IoT S-NSSAI in 2.6 GHz, a second RAN node (NG-RAN 2) 403 which in this example supports eMBB S-NSSAI in 4.9 GHz and a UE 407.

In this example the UE is configured to select a RAN node without knowing which RAN node supports which S-NSSAI. For example based on some criteria, the UE 407 transmits a registration request 400 to the AMF 401 via the first node 405, the registration request message including eMBB S-NSSAI in Requested NSSAI.

The AMF 401 is then configured to determine an Allowed NSSAI based on Requested NSSAI, UE subscription data and S-NSSAIs supported by the 5G-AN that the UE is camping on. The AMF 401 is then configured to transmit a registration accept 402. The way of how to determine the Allowed NSSAI can be in the manner as specified in 3GPP TS 23.501 as defined below:

"The Allowed NSSAI is then composed of the list of S-NSSAI(s) in the Requested NSSAI permitted based on the Subscribed S-NSSAIs and/or the list of S-NSSAI(s) for the Serving PLMN which are mapped to the HPLMN S-NSSAI (s) provided in the mapping of Requested NSSAI permitted based on the Subscribed S-NSSAIs, or, if neither Requested NSSAI nor the mapping of Requested NSSAI was provided or none of the S-NSSAIs in the Requested NSSAI are permitted, all the S-NSSAI(s) marked as default in the Subscribed S-NSSAIs and taking also into account the availability of the Network Slice instances as described in clause 5.15.8 that are able to serve the S-NSSAI(s) in the Allowed NSSAI in the current UE's Tracking Areas."

"The AMF learns the S-NSSAIs supported per TA by the 5G-AN when the 5G-AN nodes establish or update the N2 connection with the AMF (see 3GPP TS 38.413) and 3GPP TS 38.300). One or all AMF per AMF Set is then provides and updates the NSSF with the S-NSSAIs support per TA. The 5G-AN learns the S-NSSAIs per PLMN ID the AMFs it connects to support when the 5G-AN nodes establishes the N2 connection with the AMF or when the AMF updates the N2 connection with the 5G-AN (see 3GPP TS 38.413 and 3GPP TS 38.300)."

Therefore, the AMF is configured to not allow the UE to use eMBB S-NSSAI because eMBB S-NSSAI is not supported by the NG-RAN 1 405 and may provide default S-NSSAI in Allowed NSSAI to the UE 407. The RAT/Frequency Selection Priority (RFSP) set by policy control function (PCF) is based on Allowed NSSAI (in other words the default S-NSSAI in this case) which leads the UE to (re)select a cell supporting the default S-NSSAI. Consequently, the UE is only able to access default S-NSSAI afterward (even if the AMF could have provided eMBB S-NSSAI if the UE is camping on NG-RAN 2 403).

The UE would this connect until 5GC understands that requested eMBB slice is not supported in the cell where UE connected. Then UE would be NAS rejected and obliged to re-attempt with a new set of requested NSSAI. This is inefficient and undesirable.

The concept as discussed herein in the following embodiments is the provide to the UE a suitable mapping of the slicing information (S-NSSAI) which enables the UE to identify which cell to use to request access but without providing the UE with the slice information in such a manner that UE is able to easily determine which services the operators offer support for. Thus for example in some embodiments the S-NSSAI<->CAG mapping as discussed in the embodiments herein provides a suitable degree of obfuscation or indirection. In other words the embodiments as described herein prevent a UE receiving the broadcast CAGs from easily inferring which slices are supported behind because they do not know the mapping.

In some embodiments the slice-CAG ID mapping is passed from the 5GC to the UE. In these embodiments for each S-NSSAI of the list of configured S-NSSAI(s) signalled by 5GC to the UE, a list of one or more mapped CAG IDs is additionally signalled.

Additionally in some embodiments when the UE is idle it is configured to decode the list of CAG IDs supported by surrounding cells. The UE can then be configured to determine a cell selection taking into account the CAG IDs broadcast in cells and the S-NSSAI(s) it is interested in. For example, in some embodiments the UE is configured to preferably not select a cell for which the list of S-NSSAI(s) corresponding to the CAG ID list broadcast in the cell has no match with the requested NSSAI that the UE intends to use.

In some embodiments where the UE is able to determine that there are multiple cell matches, then the UE is configured to weight selections to the S-NSSAI which is most likely to be used by the UE using some prioritization process.

In some other embodiments for each S-NSSAI of the list of configured S-NSSAI(s) signalled by 5GC to the UE, a list of one or more mapped frequency bands, or, alternatively RSFP Index, is newly additionally signalled.

In such embodiments when the UE is idle it looks at the frequency bands supported by surrounding cells. The UE thus in some embodiments is able to implement a suitable method which influences the UE cell/frequency selection taking into account the frequencies used in surrounding cells and the S-NSSAI(s) the UE is interested in. For example, the UE may be configured to preferably avoid selecting a cell for which the list of S-NSSAI(s) corresponding to the frequency band used by the cell has no match with the requested NSSAI that the UE intends to use.

In some embodiments where multiple cells have a match, the method as discussed below can weight the selection to the S-NSSAI which is most likely to be used by the UE using some prioritization process.

In some embodiments a combination of the above examples is implemented. For example in some embodiments the S-NSSAIs in the configured NSSAI are mapped to both CAG(s) and frequency band identifier(s) or, the CAGs are mapped to a list of S-NSSAIs and bands identifiers.

Figure 5:
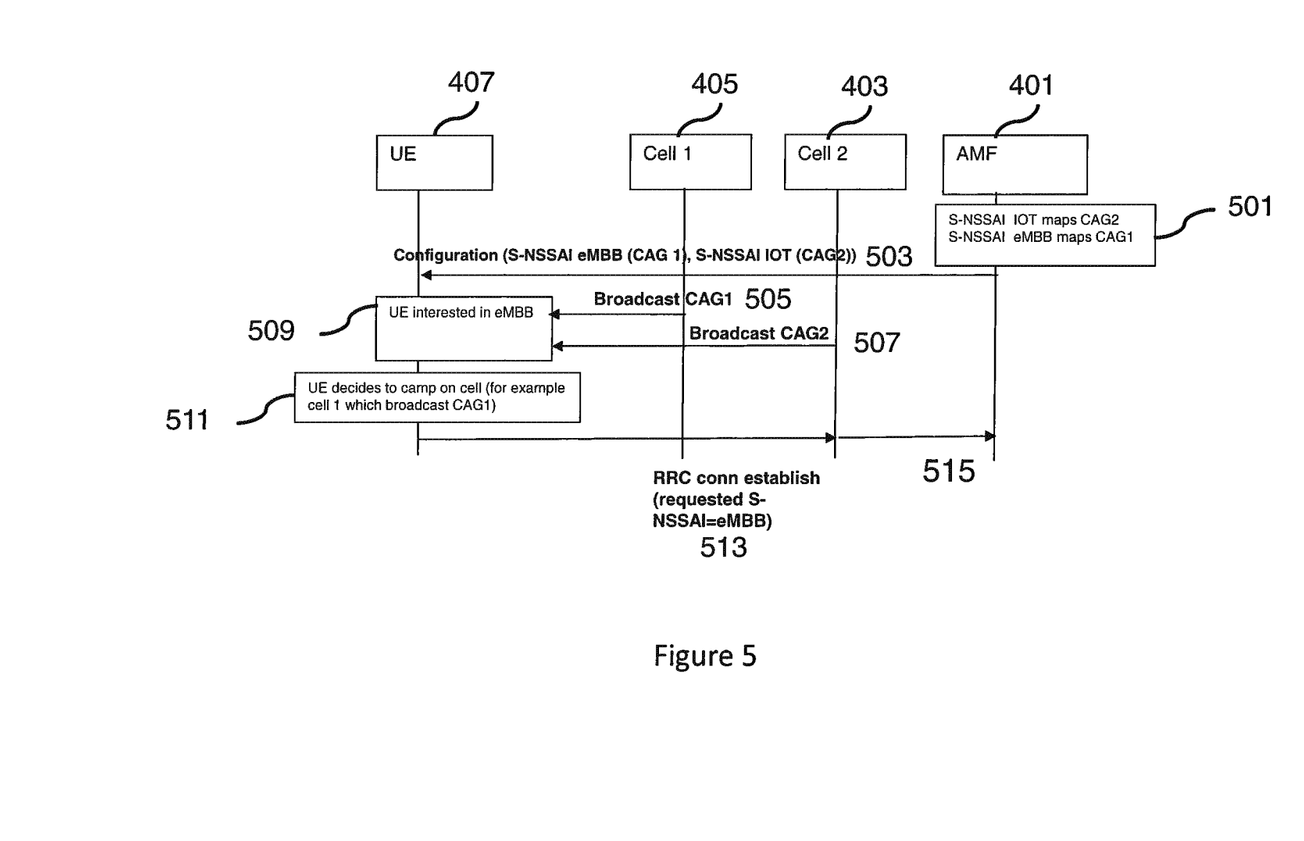
FIG. 5 shows a network flow diagram of the cell selection procedure according to some example embodiments.

With respect to FIG. 5 a network flow diagram shows the operations according to some embodiments.

The Access and Mobility Management Function (AMF) 401 is configured to generate a list of the configured Single-Network Slice Assistance Information (S-NSSAI). Furthermore the Closed Assess Group Identifiers (CAG IDs) associated with each S-NSSAI can also be sent. Thus as shown in FIG. 5 there may be a first S-NSSAI wherein the associated Internet of Things (IoT) slices are mapped to CAG1 and a second S-NSSAI wherein the Enhanced Mobile Broadband (eMBB) slices are mapped to CAG2. This is shown in FIG. 5 by step 501.

Then during a configuration operation as shown in FIG. 5 by step 503 the configuration message passed from the AMF 401 to the UE 407 comprises the slice components S-NSSAI eMBB (with CAG1) and S-NSSAI IoT (CAG2).

Additionally the Cells (or other suitable access points) are configured to transmit to the UE suitable broadcast CAG identifier information. This is shown in FIG. 5 by step 505 where the Cell 1 405 is configured to transmit CAG1 identifier information and by step 507 where the Cell 2 403 is configured to transmit CAG2 identifier information.

The UE 407 is configured to select an interest or preferred access/service. In the example shown in FIG. 5 the UE determines an interest in eMBB access as shown in FIG. 5 by step 509.

Based on the determined interest, the S-NSSAI<->CAG ID mapping the UE is configured to determine which of the cells/access points to camp onto. For example as shown in FIG. 5 the UE 407 is configured as shown in step 511 to camp onto cell 2 403 which broadcasted CAG2 identifier information.

Thus the UE 407 is in this example configured to generate and transmit to Cell 2 403 a RRC connection establish request which comprises the information where the requested S-NSSAI is eMBB as shown in FIG. 5 by step 513.

This request may then be forwarded to the AMF 401 as shown in FIG. 5 by step 515.

In such a manner the UE is able to select a cell supporting the indicated/requested S-NSSAI and there is no need to carry out any further selection/reselection operations after the initial selection.

In some embodiments when the AMF (or suitable 5G core node) transmits to the UE the list of allowed CAG IDs then the S-NSSAIs associated with each CAG ID is also transmitted.

Figure 6:
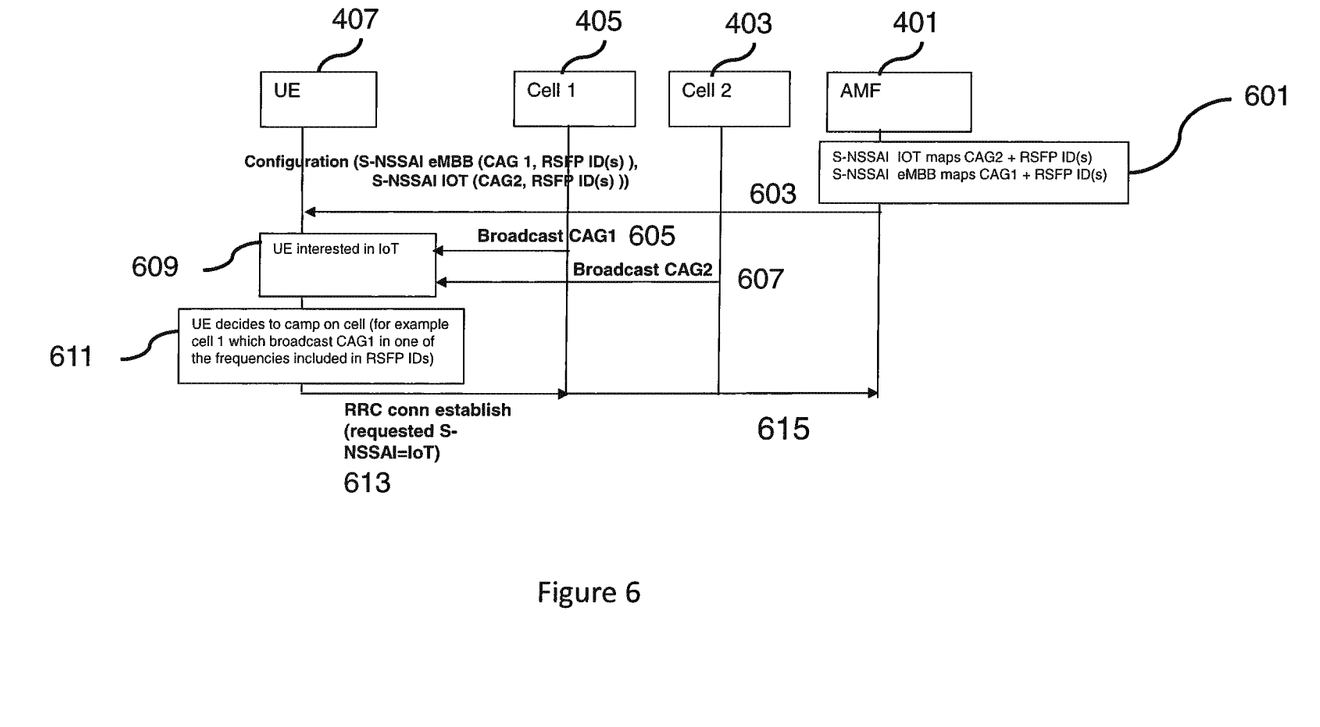
FIG. 6 shows a network flow diagram of the cell selection procedure according to some further example embodiments employing Radio Access Technology/Frequency Selection Priority identifier signalling.

With respect to FIG. 6 a network flow diagram shows the operations according to some further embodiments.

The Access and Mobility Management Function (AMF) 401 is configured to generate a list of the configured Single-Network Slice Assistance Information (S-NSSAI). Furthermore the Closed Assess Group Identifiers (CAG IDs) associated with each S-NSSAI and the frequency bands and/or the Radio Access Technology/Frequency Selection Priority identifier RSFP ID(s) can also be sent. Thus as shown in FIG. 6 there may be a first S-NSSAI wherein the associated Internet of Things (IoT) slices are mapped to CAG1 and associated frequency bands/RSFP IDs determined and a second S-NSSAI wherein the Enhanced Mobile Broadband (eMBB) slices are mapped to CAG2 and associated frequency bands/RSFP IDs determined. This is shown in FIG. 6 by step 601.

Then during a configuration operation as shown in FIG. 6 by step 603 the configuration message passed from the AMF 401 to the UE 407 comprises the slice components S-NSSAI eMBB (with CAG1) with associated RSFP IDs and S-NSSAI IoT (CAG2) with associated RSFP IDs.

Additionally the Cells (or other suitable access points) are configured to transmit to the UE suitable broadcast CAG identifier information. This is shown in FIG. 6 by step 605 where the Cell 1 405 is configured to transmit CAG1 identifier information and by step 607 where the Cell 2 403 is configured to transmit CAG2 identifier information.

The UE 407 is configured to select an interest or preferred access/service. In the example shown in FIG. 6 the UE determines an interest in IoT access as shown in FIG. 6 by step 609.

Based on the determined interest, the S-NSSAI<->CAG ID mapping the UE is configured to determine which of the cells/access points to camp onto and furthermore implement this using the associated RSFP IDs/frequency bands. Thus for example the UE can be configured to decide to camp onto the cell 1 which broadcast CAG1 in one of the frequencies included in the RSFP IDs. This is shown in FIG. 6 by the UE 407 shown in step 611 to camp onto cell 1 405 which broadcasted CAG1 identifier information.

Thus the UE 407 is in this example configured to generate and transmit to Cell 1 405 a RRC connection establish request which comprises the information where the requested S-NSSAI is IoT as shown in FIG. 6 by step 613.

This request may then be forwarded to the AMF 401 as shown in FIG. 6 by step 615.

In such embodiments as discussed above a UE that is actually interested in a first slice type (for example an eMBB/IoT network slice) is able to select a cell that does support the eMBB/IoT slice even where there is available multiple network slice supporting cells. As such these embodiments provide the UE with knowledge about slice support at each cell by providing further information to each S-NSSAI item from the list of "configured S-NSSAI" signalled from the 5GC to the UE during a suitable attach procedure.

Figure 7:
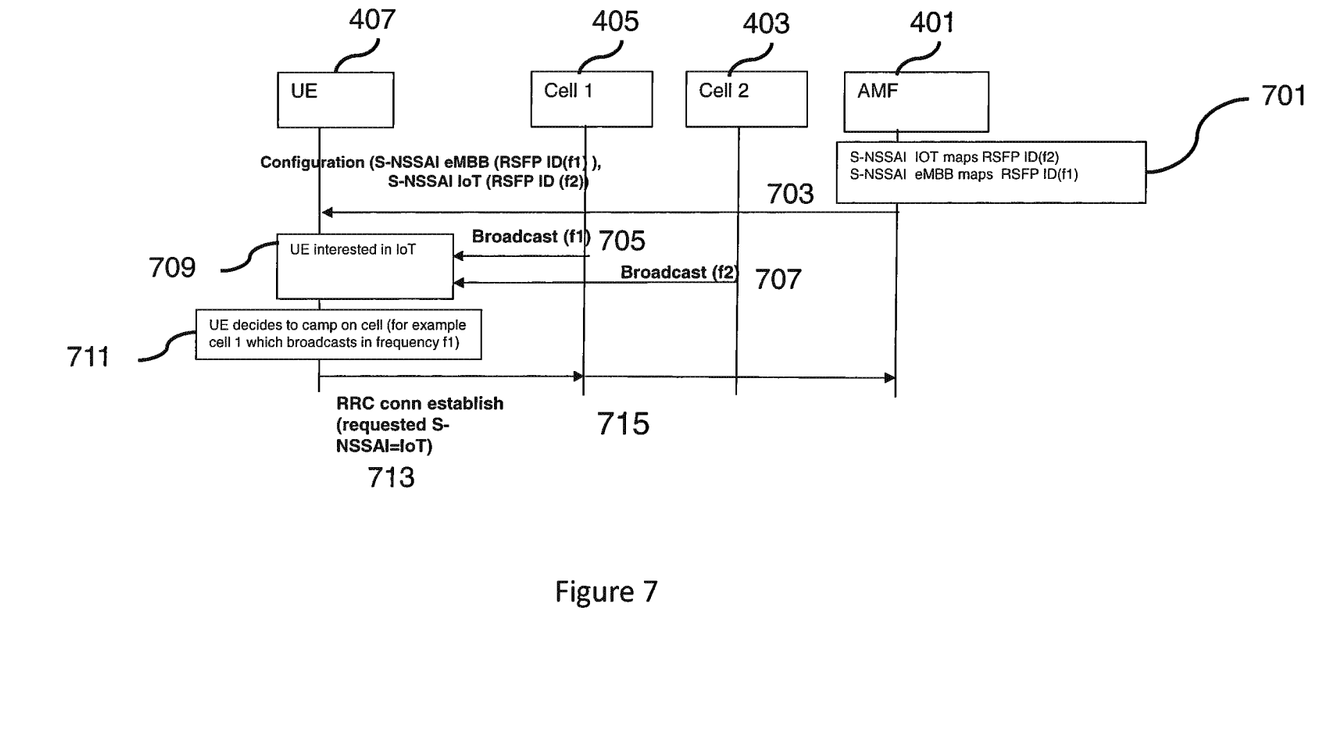
FIG. 7 shows a network flow diagram of the cell selection procedure according to some further example embodiments employing Radio Access Technology/Frequency Selection Priority identifier frequency signalling.

With respect to FIG. 7 a network flow diagram shows the operations according to some further embodiments employing Radio Access Technology/Frequency Selection Priority identifier frequency signalling.

The Access and Mobility Management Function (AMF) 401 is configured to generate a list of the configured Single-Network Slice Assistance Information (S-NSSAI). Furthermore the frequency bands in the Radio Access Technology/Frequency Selection Priority identifier RSFP ID(s) associated with each S-NSSAI are also sent.

Thus as shown in FIG. 7 there may be a first S-NSSAI wherein the associated Internet of Things (IoT) slices are mapped to frequency bands within RSFP IDs and a second S-NSSAI wherein the Enhanced Mobile Broadband (eMBB) slices are mapped to associated frequency bands within RSFP IDs. This is shown in FIG. 7 by step 701.

Then during a configuration operation as shown in FIG. 7 by step 703 the configuration message passed from the AMF 401 to the UE 407 comprises the slice components S-NSSAI eMBB with associated RSFP IDs frequency bands and S-NSSAI IoT with associated RSFP IDs frequency bands.

Additionally the Cells (or other suitable access points) are configured to transmit to the UE suitable broadcast frequency band identifier information. This is shown in FIG. 7 by step 705 where the Cell 1 405 is configured to transmit f1 identifier information (indicating Cell 1 supports f1 frequency bands) and by step 707 where the Cell 2 403 is configured to transmit f2 identifier information (indicating Cell 2 supports f2 frequency bands).

The UE 407 is configured to select an interest or preferred access/service. In the example shown in FIG. 7 the UE determines an interest in IoT access as shown in FIG. 7 by step 709.

Based on the determined interest, the S-NSSAI<->RSFP frequency band mapping the UE is configured to determine which of the cells/access points to camp onto and furthermore implement this using the associated RSFP IDs/frequency bands. For example as shown in FIG. 7 the UE 407 is configured as shown in step 711 to camp onto Cell 1 405 which broadcasted f1 identifier information.

Thus the UE 407 is in this example configured to generate and transmit to Cell 1 405 a RRC connection establish request which comprises the information where the requested S-NSSAI is IoT as shown in FIG. 7 by step 713.

This request may then be forwarded to the AMF 401 as shown in FIG. 7 by step 715.

The embodiments described above indicate this additional information should be either closed access group (CAG) IDs that use the respective S-NSSAI, or a frequency band used by the respective S-NSSAI, or both.

The UE can scan the CAG ID information broadcast by the cells (and supported frequency bands) when checking the CAG ID or supported frequency bands (or both) of the available cells in order to determine which S-NSSAI may be supported by a cell and, thus, select an appropriate cell accordingly.

This approach as discussed in the above embodiments is furthermore advantageous compared against the possibility of getting each cell to transmit their slice support as this would require significant amounts of signalling and result in broadcasting many S-NSSAIs (there can be hundreds of slices supported in a carrier/band).

It is to be noted that embodiments of the present invention may be implemented as circuitry, in software, hardware, application logic or a combination of software, hardware and application logic. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer or smart phone, or user equipment.

As used in this application, the term "circuitry" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present. This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

The described features, advantages, and characteristics of the invention can be combined in any suitable manner in one or more embodiments. One skilled in the relevant art will recognize that the invention can be practiced without one or more of the specific features or advantages of a particular embodiment. In other instances, additional features and advantages can be recognized in certain embodiments that may not be present in all embodiments of the invention. One having ordinary skill in the art will readily understand that the invention as discussed above may be practiced with steps in a different order, and/or with hardware elements in configurations which are different than those which are disclosed.

Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method, comprising:
   obtaining, at a user equipment, information on cell network slice support;
   determining, for the user equipment, a network slice; and
   selecting one cell supporting the determined network slice based on the information;
   wherein the obtaining, at the user equipment, information on cell network slice support comprises receiving a network slice group mapping from a core node,
   wherein the obtaining, at the user equipment, information on cell network slice support comprises receiving, from the core node, a list of frequency bands supported by at least one group from the network slice group mapping.

2. The method as claimed in claim 1, wherein the list of frequency bands supported by the at least one group from the network slice group mapping is identified based on a radio access technology frequency selection priority identifier.

3. The method as claimed in claim 1, wherein the cell comprise one of:
   a Next-Generation Radio Access Network cell;
   an Evolved-Universal Mobile Telecommunications Service Terrestrial Radio Access Network cell;
   an Universal Mobile Telecommunications Service Radio Access Network cell; and
   a Wi-fi network cell.

4. A method, comprising:
   generating, information on cell network slice support; and
   transmitting to a user equipment the information on cell network slice support, wherein the user equipment is configured to determine a network slice and select one cell supporting the determined network slice based on the information,
   wherein the information comprises at least one of:
   a network slice group mapping;
   a list of frequency bands supported by at least one group from the network slice group mapping; and
   radio access technology frequency selection priority identifiers supported by a network slice.

* * * * *